US012611851B2

(12) United States Patent
Liao et al.

(10) Patent No.: US 12,611,851 B2
(45) Date of Patent: Apr. 28, 2026

(54) ALUMINUM-PLASTIC FILM AND SUBSTRATE FOR ALUMINUM-PLASTIC FILM

(71) Applicant: NAN YA PLASTICS CORPORATION, Taipei (TW)

(72) Inventors: Te-Chao Liao, Taipei (TW); Ching-Yao Yuan, Taipei (TW); Wei-Tang Liao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 317 days.

(21) Appl. No.: 18/456,510

(22) Filed: Aug. 27, 2023

(65) Prior Publication Data

US 2024/0416628 A1 Dec. 19, 2024

(30) Foreign Application Priority Data

Jun. 15, 2023 (TW) ................................. 112122319

(51) Int. Cl.
 *B32B 27/08* (2006.01)
 *B32B 15/088* (2006.01)
 (Continued)

(52) U.S. Cl.
 CPC ............ *B32B 27/08* (2013.01); *B32B 15/088* (2013.01); *B32B 15/20* (2013.01); *B32B 27/308* (2013.01); *B32B 27/34* (2013.01); *B32B 27/36* (2013.01); *B32B 2270/00* (2013.01); *B32B 2307/306* (2013.01); *B32B*

*2307/414* (2013.01); *B32B 2457/10* (2013.01); *H01M 50/119* (2021.01); *H01M 50/121* (2021.01);
(Continued)

(58) Field of Classification Search
 None
 See application file for complete search history.

(56) References Cited

U.S. PATENT DOCUMENTS

| | | | | | |
|---|---|---|---|---|---|
| 4,122,248 | A | * | 10/1978 | Pfleger | C08F 210/02 526/329 |
| 4,965,320 | A | * | 10/1990 | Overbergh | B29C 61/0658 525/149 |

(Continued)

FOREIGN PATENT DOCUMENTS

| | | |
|---|---|---|
| CN | 1930231 A | 3/2007 |
| CN | 101351329 A | 1/2009 |

(Continued)

*Primary Examiner* — Vivian Chen
(74) *Attorney, Agent, or Firm* — Li & Cai Intellectual Property Office

(57) ABSTRACT

An aluminum-plastic film and a substrate for an aluminum-plastic film are provided. The aluminum-plastic film includes a polyester layer, a composite resin layer, a polyamide layer, and an aluminum layer. The composite resin layer is disposed between the polyester layer and the polyamide layer. The aluminum layer is disposed on the polyamide layer. The polyester layer, the composite resin layer, and the polyamide layer are integrally formed by co-extrusion. The composite resin layer includes a terpolymer and a polyolefin resin. Based on a total weight of the composite resin layer being 100 wt %, an amount of the terpolymer is higher than 45 wt %. The terpolymer contains structural units of ethylene butyl acrylate.

8 Claims, 1 Drawing Sheet

<div style="display:flex">

<div>

(51) Int. Cl.

| | |
|---|---|
| *B32B 15/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *H01M 50/119* | (2021.01) |
| *H01M 50/121* | (2021.01) |
| *H01M 50/129* | (2021.01) |

(52) U.S. Cl.
CPC .... *H01M 50/129* (2021.01); *Y10T 428/31681* (2015.04); *Y10T 428/31743* (2015.04); *Y10T 428/31746* (2015.04); *Y10T 428/3175* (2015.04); *Y10T 428/31757* (2015.04); *Y10T 428/31786* (2015.04); *Y10T 428/31797* (2015.04)

(56) References Cited

U.S. PATENT DOCUMENTS

| | | | |
|---|---|---|---|
| 5,053,457 A * | 10/1991 | Lee | C09J 151/06 |
| | | | 525/207 |
| 5,336,721 A * | 8/1994 | Kiang | C09J 123/08 |
| | | | 525/227 |
| 11,020,944 B2 | 6/2021 | Broadus et al. | |
| 2003/0152791 A1* | 8/2003 | Lu | B32B 27/32 |
| | | | 428/521 |
| 2005/0100723 A1* | 5/2005 | Tanaka | B32B 27/08 |
| | | | 428/458 |
| 2005/0106344 A1* | 5/2005 | Morris | B32B 37/153 |
| | | | 428/35.3 |

</div>

<div>

| | | | |
|---|---|---|---|
| 2008/0254348 A1 | 10/2008 | Hatta et al. | |
| 2009/0208765 A1* | 8/2009 | McGee | B32B 7/12 |
| | | | 428/482 |
| 2016/0046765 A1* | 2/2016 | Oda | C08L 77/06 |
| | | | 528/331 |
| 2020/0071575 A1* | 3/2020 | Bruneau | C09J 7/35 |

FOREIGN PATENT DOCUMENTS

| | | | |
|---|---|---|---|
| CN | 101052676 B | 6/2011 | |
| CN | 104332565 A | 2/2015 | |
| CN | 106671534 A | 5/2017 | |
| CN | 213649039 U | 7/2021 | |
| EP | 1981101 B1 | 8/2010 | |
| JP | 54158478 A | 12/1979 | |
| JP | 4261846 A | 9/1992 | |
| JP | 2009227790 A | 10/2009 | |
| JP | 2011503903 A | 1/2011 | |
| JP | 2014501029 A | 1/2014 | |
| JP | 2017505536 A | 2/2017 | |
| JP | 2017136834 A | 8/2017 | |
| JP | 2018111242 A | 7/2018 | |
| JP | 2018518035 A | 7/2018 | |
| JP | 2023165047 A | 11/2023 | |
| WO | WO2017170333 A1 | 10/2017 | |
| WO | WO 2018-097329 A | * 5/2018 | |
| WO | WO 2018-097330 A | * 5/2018 | |
| WO | WO2018079681 A1 | 5/2018 | |
| WO | WO2018097329 A1 | 5/2018 | |
| WO | WO2018097330 A1 | 5/2018 | |
| WO | WO2024106504 A1 | 5/2024 | |

* cited by examiner

</div>

</div>

ALUMINUM-PLASTIC FILM AND SUBSTRATE FOR ALUMINUM-PLASTIC FILM

CROSS-REFERENCE TO RELATED PATENT APPLICATION

This application claims the benefit of priority to Taiwan Patent Application No. 112122319, filed on Jun. 15, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an aluminum-plastic film and a substrate for an aluminum-plastic film, and more particularly to an aluminum-plastic film and a substrate for an aluminum-plastic film applied on batteries.

BACKGROUND OF THE DISCLOSURE

For packaging materials, it can be difficult to achieve an expected protection by using a unitary material. Therefore, most commercially available packaging materials are multi-layer films. By virtue of different combinations of various layers, the multi-layer films can provide the expected protection effect.

Common processes for manufacturing the multi-layer films include a coating and lamination process. However, an adhesive layer is used in the coating and lamination process for the combination of various layers, and solvents required in the adhesive layer cause harm to the environment. Therefore, the manufacturing processes of conventional packaging materials still need to be improved.

In addition to the protection effect, a connection effect between the various layers is also an important property of the packaging materials. When the packaging materials are used for different applications, the expected connection effect between layers of the packaging materials also changes accordingly.

For example, when the packaging material is used to encapsulate the battery pack and the electrolyte, the packaging material needs to have a certain level of heat resistance, electrical insulation, flexibility, electrolyte resistance, and stretchability, such that the packaging material can undergo the subsequent processes of the battery manufacturing.

Therefore, how to enable the packaging material to have an expected protective effect and enhance the connection effect between the various layers by material improvement, so as to apply in different applications and prevent the solvent from harming the environment, has become one of the important issues to be solved in the relevant industry.

SUMMARY OF THE DISCLOSURE

In response to the above-referenced technical inadequacies, the present disclosure provides an aluminum-plastic film and a substrate for an aluminum-plastic film.

In order to solve the above-mentioned problems, one of the technical aspects adopted by the present disclosure is to provide an aluminum-plastic film. The aluminum-plastic film includes a polyester layer, a composite resin layer, a polyamide layer, and an aluminum layer. The composite resin layer is disposed between the polyester layer and the polyamide layer. The aluminum layer is disposed on the polyamide layer. The polyester layer, the composite resin layer, and the polyamide layer are integrally formed by co-extrusion. The composite resin layer includes a terpolymer and a polyolefin resin. Based on a total weight of the composite resin layer being 100 wt %, an amount of the terpolymer is higher than 45 wt %. The terpolymer contains structural units of ethylene butyl acrylate.

In one of the possible or preferred embodiments, the terpolymer is polymerized from an ethylene monomer, a butyl acrylate monomer, and an acrylic monomer.

In certain embodiments, based on a total weight of the terpolymer being 100 wt %, a total amount of the ethylene monomer and the butyl acrylate monomer ranges from 14% to 20%.

In certain embodiments, the terpolymer has a maleic anhydride functional group.

In certain embodiments, the ethylene monomer is grafted by a maleic anhydride functional group, and a grafting ratio of the maleic anhydride functional group of the ethylene monomer ranges from 5 wt % to 15 wt %.

In certain embodiments, a weight ratio of the terpolymer to the polyolefin resin ranges from 1:1 to 3:1.

In certain embodiments, the polyester layer includes polyethylene terephthalate, an intrinsic viscosity of the polyethylene terephthalate ranges from 0.60 to 0.68, and a melting point of the polyethylene terephthalate ranges from 240° C. to 250° C.

In certain embodiments, a number average molecular weight of a material of the polyamide layer ranges from 20000 g/mol to 23000 g/mol, a relative viscosity of the material of the polyamide layer ranges from 2.7 to 2.9, and a melting point of the material of the polyamide layer ranges from 215° C. to 225° C.

In another aspect, the present disclosure provides a substrate for an aluminum-plastic film. The substrate for an aluminum-plastic film includes a polyester layer, a composite resin layer, and a polyamide layer. The composite resin layer is disposed between the polyester layer and the polyamide layer. The composite resin layer includes a terpolymer and a polyolefin resin. Based on a total weight of the composite resin layer being 100 wt %, an amount of the terpolymer is higher than 45 wt %. The terpolymer contains structural units of ethylene butyl acrylate. The polyester layer, the composite resin layer, and the polyamide layer are integrally formed by co-extrusion.

In certain embodiments, a haze of the substrate is lower than 5%.

Therefore, in the aluminum-plastic film and the substrate for an aluminum-plastic film provided by the present disclosure, by virtue of "based on a total weight of the composite resin layer being 100 wt %, an amount of the terpolymer being higher than 45 wt %," "the terpolymer containing structural units of ethylene butyl acrylate," and "the polyester layer, the composite resin layer, and the polyamide layer being integrally formed by co-extrusion," the aluminum-plastic film and the substrate for an aluminum-plastic film have high transparency and good connection between layers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
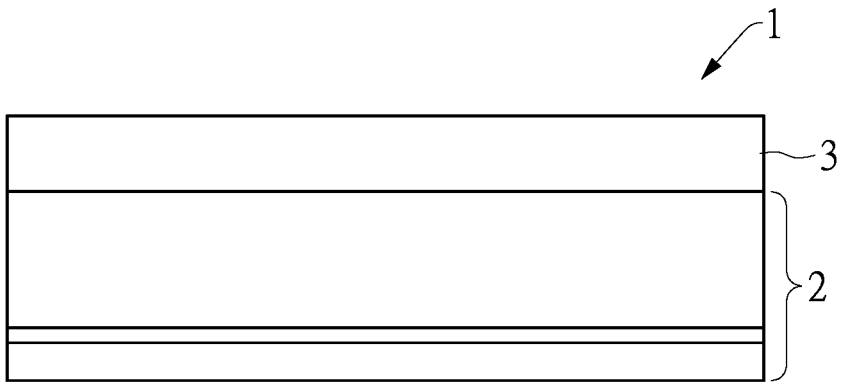
FIG. 1 is a schematic side view of an aluminum-plastic film of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, a schematic side view of an aluminum-plastic film of the present disclosure is shown in FIG. 1. The aluminum-plastic film 1 includes a substrate for an aluminum-plastic film 2 and an aluminum layer 3. The aluminum layer 3 can be disposed on the substrate for an aluminum-plastic film 2 via an adhesive layer, but the present disclosure is not limited thereto. The aluminum layer 3 can be disposed on the substrate for an aluminum-plastic film 2 by various methods as long as the aluminum layer 3 can be fixedly disposed on the substrate for an aluminum-plastic film 2.

In the present disclosure, the substrate for an aluminum-plastic film 2 is integrally formed by co-extrusion. Therefore, in a process for manufacturing the substrate for an aluminum-plastic film 2, a step of coating the adhesive layer can be excluded therefrom. Because the adhesive layer is not used, the use of a solvent type solution can be prevented, so that the problem of peeling due to aging of the adhesive layer can be solved. Therefore, the process for manufacturing the substrate for an aluminum-plastic film 2 of the present disclosure is simple and environmentally friendly.

Figure 2:
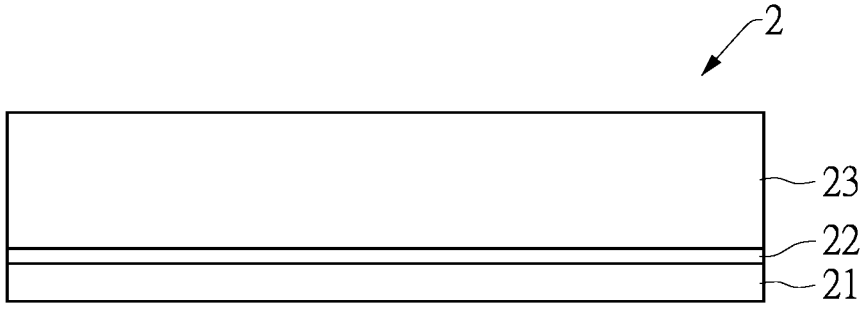
FIG. 2 is a schematic side view of a substrate for an aluminum-plastic film of the present disclosure.

Referring to FIG. 2, FIG. 2 is a schematic side view of a substrate for an aluminum-plastic film of the present disclosure. The substrate for an aluminum-plastic film 2 includes a polyester layer 21, a composite resin layer 22, and a polyamide layer 23.

When the substrate for an aluminum-plastic film 2 is applied as a packaging material for battery, the polyester layer 21 comes in contact with an electrolyte. Therefore, the polyester layer 21 needs to have good electrolyte resistance and thermal resistance. The polyamide layer 23 is in contact with the aluminum layer 3. In order to protect other layers of the aluminum-plastic film, the polyamide layer 23 needs to have good penetration resistance so as to ensure the safety of the battery during use. In an exemplary embodiment, a thickness of the substrate for an aluminum-plastic film 2 ranges from 15 μm to 45 μm. However, the present disclosure is not limited thereto.

Due to the difference in materials, polyester and polyamide cannot be combined by melting. If polyester and polyamide are extruded by co-extrusion, materials will delaminate and fail to form a composite film. Therefore, a specific composite resin material is selected in the present disclosure. The specific composite resin material is disposed between the polyester layer 21 and the polyamide layer 23 so as to form a composite resin layer 22. The composite resin layer 22 can be respectively connected to the polyester layer 21 and the polyamide layer 23 such that the substrate for an aluminum-plastic film 2 can have an appropriate peeling strength and stretching strength.

The composite resin layer 22 needs to have properties of high transparency and low haze so that the substrate for an aluminum-plastic film 2 can also have properties of high transparency and low haze. Through the aluminum-plastic film 2 having the properties of high transparency and low haze, it is convenient to inspect whether or not defects are formed after a stamping process of a battery and whether or not a barcode on the aluminum layer 3 is clearly visible for quality control.

In the present disclosure, a material to form the composite resin layer 22 includes a terpolymer. The terpolymer has polarity. An addition of the terpolymer enhances the connection effect between the polyester resin layer 21, the composite resin layer 22, and the polyamide layer 23.

The terpolymer contains repeating structural units of ethylene butyl acrylate. In other words, monomers to polymerize the terpolymer include an ethylene monomer and a butyl acrylate monomer.

In an exemplary embodiment, the terpolymer is polymerized from an ethylene monomer, a butyl acrylate monomer, and an acrylic acid monomer. In addition, the ethylene monomer, the butyl acrylate monomer, and the acrylic acid monomer are simultaneously copolymerized. Accordingly, the terpolymer has polarity, so that the connection effect between the composite resin layer 22 and the polyester resin layer 21 and the connection effect between the composite resin layer 22 and the polyamide layer 23 can be enhanced. However, the present disclosure is not limited thereto.

In order to enhance the connection effect, a total amount of the ethylene monomer and the butyl acrylate monomer in the terpolymer is controlled. In an exemplary embodiment, based on a total weight of the terpolymer being 100 wt %, the total amount of the ethylene monomer and the butyl acrylate monomer in the terpolymer ranges from 14 wt % to 20 wt %. For example, the total amount of the ethylene monomer and the butyl acrylate monomer in the terpolymer can be 15 wt %, 16 wt %, 17 wt %, 18 wt %, or 19 wt %.

In an exemplary embodiment, a Shore hardness of the terpolymer ranges from 85 A to 90 A. A melting index of the terpolymer measured at 190° C./2.16 kg ranges from 6.5 to 7.5.

For a stronger connection effect, the terpolymer can further have a maleic anhydride functional group. In an exemplary embodiment, the ethylene monomer selected to polymerize the terpolymer is grafted by a maleic anhydride functional group. Specifically, a grafting ratio of the maleic anhydride functional group of the ethylene monomer ranges from 5 wt % to 15 wt %.

An amount of the terpolymer of the composite resin layer 22 needs to reach a certain amount so as to achieve appropriate connection effect. Specifically, based on the total weight of the composite resin layer 22 being 100 wt %, the amount of terpolymer in the composite resin layer 22 is higher than or equal to 45 wt %.

In a preferable embodiment, the amount of terpolymer in the composite resin layer 22 is higher than or equal to 50 wt %. For example, the amount of terpolymer in the composite resin layer 22 can be 55 wt %, 60 wt %, 65 wt %, 70 wt %, 75 wt %, 80 wt %, 85 wt %, 90 wt %, 95 wt %, or 100 wt %.

In addition to the terpolymer, the material to form the composite resin layer 22 can further include a polyolefin resin. An addition of the polyolefin resin can decrease a material cost and enhance stretchability of the composite resin layer 22 to facilitate subsequent stretching processes. It should be noted that the amount of the terpolymer in the composite resin layer 22 still needs to be higher than or equal to 45 wt %.

In an exemplary embodiment, the polyolefin resin is a low density polyethylene. The polyolefin resin and the terpolymer have good compatibility, such that the polyolefin resin and the terpolymer can be mixed to form the composite resin layer 22 together without negatively influencing the stretchability of the composite resin layer 22. Preferably, the polyolefin resin is a low density polyethylene. Accordingly, the substrate for an aluminum-plastic film 2 can have properties of high transparency and low haze.

In an exemplary embodiment, a material of the polyester layer 21 includes polyethylene terephthalate that has a melting point ranging from 240° C. to 250° C. An intrinsic viscosity of the polyethylene terephthalate ranges from 0.60 to 0.68. A material of the polyamide layer 23 Nylon 6 (also known as policapram) that has a molecular weight ranging from 20000 g/mol to 23000 g/mol. An intrinsic viscosity of the Nylon 6 ranges from 2.7 to 2.9. A melting point of the Nylon 6 ranges from 215° C. to 225° C. A peroxide value of the Nylon 6 is 42±2 meq/kg.

A manner for manufacturing the substrate for an aluminum-plastic film 2 includes steps of: drying raw materials (step S1); co-extruding the raw materials so as to form a three-layered laminate layer (step S2); biaxially stretching the three-layered laminate layer to an expected thickness (step S3); heating the stretched three-layered laminate layer to manufacture the substrate for an aluminum-plastic film 2 (step S4); after being cooled, rolling up the substrate for an aluminum-plastic film 2 (step S5).

For the convenience of illustrating the effects of the present disclosure, the substrates for the aluminum-plastic film 2 of Examples 1, 2 and Comparative Example 1 are prepared according to the above-mentioned steps S1 to S5. The differences and the properties of Examples 1, 2 and Comparative Example 1 are listed in Table 1.

Example 1

In step S1, polyethylene terephthalate (abbreviated as PET below) (the material to form the polyester layer 21), the composite resin material (the material to form the composite resin layer 22), and Nylon 6 (the material to form the polyamide layer 23) are dried at an environment of a temperature from 110° C. to 130° C. and a dew point of −40° C. for 6 hours to 8 hours. The composite resin material includes the terpolymer and the low density polyethylene (abbreviated as LDPE below). A weight ratio of the terpolymer to the low density polyethylene is 1:1. The terpolymer (abbreviated as EBA-AA) is polymerized from an ethylene monomer, a butyl acrylate monomer, and an acrylic monomer. A grafting ratio of the maleic anhydride functional group in the ethylene monomer ranges from 5 wt % to 15 wt %. In the present disclosure, the grafting ratio is calculated by a formula of: (a weight after grafting−a weight before grafting)/(a weight before grafting)×100%.

In step S2, processing temperatures for screws in a three-layered co-extruding device correspondingly forming the polyester layer 21, the composite resin layer 22, and the polyamide layer 23 are set at 260° C., 250° C., and 250° C., respectively. A temperature of a feedblock is set at 250° C. Thicknesses of the polyester layer 21, the composite resin layer 22, and the polyamide layer 23 after being co-extruded respectively are 40 μm, 16 μm, and 144 μm. A thickness of the three-layered laminate layer is 200 μm.

In step S3, the thicknesses of the polyester layer 21, the composite resin layer 22, and the polyamide layer 23 after being stretched are respectively 5 μm, 2 μm, and 18 μm. A thickness of the substrate for an aluminum-plastic film 2 is 25 μm.

A haze and a visible light transmittance of the substrate for an aluminum-plastic film 2 are measured according to the standard ASTM D1003 conducted by American Society for Testing and Materials (ASTM) by using a spectrophotometer (model: X-rite Color-Eye® 7000A) provided by X-Rite®, Inc. According to results, the haze of the substrate for an aluminum-plastic film 2 is 3.7%, and the visible light transmittance of the substrate for an aluminum-plastic film 2 is 91.6%.

A stretching strength of the substrate for an aluminum-plastic film 2 are measured according to the standard ASTM D882 conducted by American Society for Testing and Materials (ASTM) by using a universal testing machine (model: AG-X) provided by Shimadzu Corporation®. According to results, the stretching strength of the substrate for an aluminum-plastic film 2 is 9.7 kg/cm$^2$.

In order to evaluate the adhesive effect between layers of the substrate for an aluminum-plastic film 2, the substrate for an aluminum-plastic film 2 is torn by hand. However, a torn section is found to be jagged, indicating that the adhesive effect between layers is weak.

Example 2

The raw materials and the operations in Example 2 are similar to those in Example 1. The difference is that the weight ratio of the terpolymer (polymerized from the ethylene monomer, the butyl acrylate monomer, and the acrylic monomer) to the low density polyethylene in Example 2 is 3:1.

In Example 2, a thickness of the substrate for an aluminum-plastic film 2 is 25 μm. After being measured, the haze of the substrate for an aluminum-plastic film 2 is 1.2%. The visible light transmittance of the substrate for an aluminum-plastic film 2 is 91.3%. The stretching strength of the substrate for an aluminum-plastic film 2 is 12.4 kg/cm$^2$. After being torn by hand, the torn section of the substrate for an aluminum-plastic film 2 is found to be smooth. In other words, the adhesive effect between layers in Example 2 is strong.

Comparative Example 1

The raw materials and the operations in Comparative Example 1 are similar to those in Example 2. The difference is that the composite resin material includes not only the terpolymer but also polyethylene terephthalate. The weight ratio of the terpolymer (polymerized from the ethylene monomer, the butyl acrylate monomer, and the acrylic monomer) to the polyethylene terephthalate in Comparative Example 1 is 3:1.

In Comparative Example 1, a thickness of the substrate for an aluminum-plastic film 2 is 25 μm. After being measured, the haze of the substrate for an aluminum-plastic film 2 is 25.7%. The visible light transmittance of the substrate for an aluminum-plastic film 2 is 93.5%. The stretching strength of the substrate for an aluminum-plastic film 2 is 13.6 kg/cm$^2$. After being torn by hand, the torn section of the substrate for an aluminum-plastic film 2 is found to be mostly even with certain slight unevenness. In other words, the adhesive effect between layers in Comparative Example 1 is acceptable.

TABLE 1

| | Example 1 | Example 2 | Comparative Example 1 |
|---|---|---|---|
| Polyester layer | PET | PET | PET |
| Composite resin layer (weight ratio) | EBA-AA:LDPE = 1:1 | EBA-AA:LDPE = 3:1 | EBA-AA:PET = 3:1 |
| Polyamide layer | Nylon 6 | Nylon 6 | Nylon 6 |
| Property | | | |
| Haze | 3.7% | 1.2% | 25.7% |
| Visible light transmittance | 91.6% | 91.3% | 93.5% |
| Stretching strength | 9.7 kg/cm$^2$ | 12.4 kg/cm$^2$ | 13.6 kg/cm$^2$ |

According to the results, when the amount of the terpolymer in the composite resin layer 22 is higher than 45 wt %, the composite resin layer 22 can be connected with the polyester layer 21 and the polyamide layer 23 by co-extrusion. In addition, the connection effects between the composite resin layer 22 with the polyester layer 21 and the polyamide layer 23 are good. Therefore, the substrate for an aluminum-plastic film 2 overcomes the drawbacks of secondary coating and lamination process and the drawbacks of pasting adhesive layer for manufacturing a laminate film. Moreover, the substrate for an aluminum-plastic film 2 can be conveniently used by downstream manufacturers.

The disposition of the composite resin layer 22 does not negatively influence the visible light transmittance of the substrate for an aluminum-plastic film 2. Specifically, the visible light transmittance of the substrate for an aluminum-plastic film 2 can be higher than 90%.

When the polyolefin resin is mixed with the terpolymer, the material cost can be decreased and the stretchability of the composite resin layer 22 can be enhanced. According to Table 1, the stretching strengths of Examples 1 and 2 are lower than that of Comparative Example 1. Therefore, the addition of the polyolefin resin can enhance the stretchability of the composite resin layer 22. Specifically, the stretching strengths of the substrate for an aluminum-plastic film 2 range from 8 kg/cm$^2$ to 13 kg/cm$^2$.

Compared to the addition of the polyethylene terephthalate, the addition of the polyolefin resin can maintain the substrate for an aluminum-plastic film 2 to have the property of low haze for being applied in various applications. Specifically, the haze of the substrate for an aluminum-plastic film 2 is lower than 5%, preferably lower than 4%, and more preferably lower than 3%.

Beneficial Effects of the Embodiments

In conclusion, in the an aluminum-plastic film and a substrate for an aluminum-plastic film provided by the present disclosure, by virtue of "based on a total weight of the composite resin layer being 100 wt %, an amount of the terpolymer being higher than 45 wt %," "the terpolymer containing structural units of ethylene butyl acrylate," and "the polyester layer, the composite resin layer, and the polyamide layer being integrally formed by co-extrusion," the aluminum-plastic film and the substrate for an aluminum-plastic film have high transparency and good connection between layers.

Further, the material of the present disclosure is selected for battery packaging materials. The terpolymer has properties of high transparency and low haze. In addition, the terpolymer can be well connected with both polyester and polyamide. Therefore, the substrate for an aluminum-plastic film of the present disclosure can be easily and directly manufactured by co-extrusion.

In order to optimize the connection effect between layers, the terpolymer at least contains the repeating structural units of ethylene butyl acrylate. Moreover, when the terpolymer is polymerized from the ethylene monomer, the butyl acrylate monomer, and the acrylic monomer, the terpolymer can have the best connection effect with polyester and polyamide. In addition, the terpolymer can have a maleic anhydride functional group.

On the other hand, the material of the polyester layer and the material of the polyamide layer are also adjusted so as to optimize the connection effect between layers and the properties of the aluminum-plastic film, such as electrolyte resistance, thermal resistance, and penetration resistance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An aluminum-plastic film, comprising:
   a polyester layer;
   a composite resin layer including a terpolymer and a polyolefin resin, wherein, based on a total weight of the composite resin layer being 100 wt %, an amount of the terpolymer is higher than 45 wt %, and the terpolymer contains structural units of ethylene butyl acrylate;

a polyamide layer, wherein the composite resin layer is disposed between the polyester layer and the polyamide layer, and the polyester layer, the composite resin layer, and the polyamide layer are integrally formed by co-extrusion; and an aluminum layer disposed on the polyamide layer;

wherein the terpolymer is polymerized from an ethylene monomer, a butyl acrylate monomer, and an acrylic monomer, and a total amount of the ethylene monomer and the butyl acrylate monomer ranges from 14% to 20%, based on a total weight of the terpolymer being 100 wt %.

2. The aluminum-plastic film according to claim 1, wherein the terpolymer has a maleic anhydride functional group.

3. The aluminum-plastic film according to claim 1, wherein the ethylene monomer is grafted by a maleic anhydride functional group, and a grafting ratio of the maleic anhydride functional group of the ethylene monomer ranges from 5 wt % to 15 wt %.

4. The aluminum-plastic film according to claim 1, wherein a weight ratio of the terpolymer to the polyolefin resin ranges from 1:1 to 3:1.

5. The aluminum-plastic film according to claim 1, wherein the polyester layer includes polyethylene tereph-thalate, an intrinsic viscosity of the polyethylene terephtha-late ranges from 0.60 to 0.68, and a melting point of the polyethylene terephthalate ranges from 240° C. to 250° C.

6. The aluminum-plastic film according to claim 1, wherein a number average molecular weight of a material of the polyamide layer ranges from 20000 g/mol to 23000 g/mol, a relative viscosity of the material of the polyamide layer ranges from 2.7 to 2.9, and a melting point of the material of the polyamide layer ranges from 215° C. to 225° C.

7. A substrate for an aluminum-plastic film, comprising:

a polyester layer;

a composite resin layer including a terpolymer and a polyolefin resin, wherein, based on a total weight of the composite resin layer is 100 wt %, an amount of the terpolymer being higher than 45 wt %, and the terpoly-mer contains structural units of ethylene butyl acrylate; and a polyamide layer, wherein the composite resin layer is disposed between the polyester layer and the polyamide layer, and the polyester layer, the composite resin layer, and the polyamide layer are integrally formed by co-extrusion;

wherein the terpolymer is polymerized from an ethylene monomer, a butyl acrylate monomer, and an acrylic monomer, and a total amount of the ethylene monomer and the butyl acrylate monomer ranges from 14% to 20%, based on a total weight of the terpolymer being 100 wt %.

8. The substrate for an aluminum-plastic film according to claim 7, wherein a haze of the substrate for an aluminum-plastic film is lower than 5%.

* * * * *